United States Patent
Oh et al.

[19]

[11] Patent Number: 5,912,532
[45] Date of Patent: *Jun. 15, 1999

[54] WHITE-LIGHT EMITTING ELECTROLUMINESCENT DISPLAY AND FABRICATING METHOD THEREOF

[75] Inventors: Myung Hwan Oh; Taek Sang Hahn; Yun Hi Lee; Tae Ho Yeom; Dong Ho Kim, all of Seoul; Dong Ky Shin; Chun Woo Lee, both of Kumi; Seong Jae Jeung, Kumi, all of Rep. of Korea

[73] Assignee: Korea Institute of Science and Technology, Seoul, Rep. of Korea

[*] Notice: This patent is subject to a terminal disclaimer.

[21] Appl. No.: 08/764,030

[22] Filed: Dec. 12, 1996

Related U.S. Application Data

[63] Continuation of application No. 08/552,235, Nov. 2, 1995, abandoned.

[30] Foreign Application Priority Data

Jan. 21, 1995 [KR] Rep. of Korea ................... 1030/1995

[51] Int. Cl.[6] .................................................. H05B 33/00
[52] U.S. Cl. .......................... 313/503; 313/506; 313/509; 428/690
[58] Field of Search ..................... 313/503, 506, 313/509; 315/169.3; 252/301.4 S, 301.4 H; 428/690, 917

[56] References Cited

U.S. PATENT DOCUMENTS

| | | |
|---|---|---|
| 5,200,277 | 4/1993 | Nakayama et al. . |
| 5,352,543 | 10/1994 | Ryu . |
| 5,476,727 | 12/1995 | Maruta . |
| 5,504,389 | 4/1996 | Dickey . |

OTHER PUBLICATIONS

Jayaraj, M.K. et al, *J. Electrochem. Soc.*, vol. 138, No. 5, pp. 1512–1516 (1991): "AC Thin Film Electroluminescent Devices with Rare Earth Doped ZnS".

*Primary Examiner*—Ashok Patel
*Attorney, Agent, or Firm*—Morrison & Foerster

[57] ABSTRACT

An improved white-lite emitting electroluminescent display capable of emitting a light having a red, blue, and green wave length in a single material and having a buffer layer of $Si_xN_y$ between a dielectric layer of $BaTa_2O_6$ and a light-emitting layer, which includes a substrate; a lower dielectric layer of $BaTa_2O_6$ formed on a transparent electrode; a light-emitting layer of SrS:Pr,F formed on the lower dielectric layer; a buffer layer of $Si_xN_y$ formed on the light-emitting layer; a upper dielectric layer of $BaTa_2O_6$ formed on the buffer layer; and an upper electrode formed on the upper dielectric layer, and further includes the steps of a first step which forms a lower electrode on a substrate; a second step which forms a light-emitting layer of SrS:Pr.F on a lower dielectric layer; a third step which forms a buffer layer of $Si_xN_y$ on the light-emitting layer; a fourth step which forms a upper dielectric layer of $BaTa_2O_6$ on the buffer layer; and a fifth step which deposits an aluminum electrode on the upper dielectric layer.

6 Claims, 4 Drawing Sheets

WHITE-LIGHT EMITTING ELECTROLUMINESCENT DISPLAY AND FABRICATING METHOD THEREOF

This application is a continuation of application Ser. No. 08/552,235, filed Nov. 2, 1995, now abandoned.

BACKGROUND OF THE INVENTION

1. Field of the Invention

The present invention relates to a white-light emitting electroluminescent display and a fabricating method thereof, and in particular to an improved white-light emitting electroluminescent display and a fabricating method thereof capable of emitting a light having a red, blue, and green wavelengths in a single light-emitting material and having a buffer layer of $Si_xN_y$ between a lower dielectric layer of $BaTa_2O_6$ and a light-emitting layer.

2. Description of the Conventional Art

Studies on a small-sized and thin-type flat panel display device having lightness have been widely conducted in the industry for use in a high definition television which requires a high resolution.

Among the above described small-sized and thin-type flat panel display devices, an electroluminescent display (hereinafter called the "ELD") which is a kind of a solid device, was introduced, which well works under a special working environment in which vibrations, impacts, and temperature changes take place.

The ELD is named because it has an light-emitting layer between two electrodes when an alternating current is applied to the two electrodes. Here, to enable the above described ELD to emit colorful lights, three different kinds of ELD emitting material and an emitting thin film fabrication method should be developed in advance. As a result, a red- and green-lights emitting ELD material were developed and had been used in the industry; however, there are some problems in fabricating a blue-light emitting ELD material and in developing a thin film-type ELD.

In another method of fabricating a full color emitting ELD, a method of providing full color ELD according to the "color by white" concept is the simplest method for achieving a multi- or full-color display. That is, it is directed to fabricate an ELD capable of emitting a red, blue, and green lights using a single white-light emitting layer and a thin film using a single host material and a single light-emitting center.

In this case, the conventional ELD includes a substrate, a lower electrode formed on the substrate, a lower dielectric layer formed on the lower electric layer, a light-emitting layer formed on the lower dielectric layer, a upper dielectric layer formed on the light-emitting layer, and an upper electrode formed on the upper dielectric layer. Here, an alternating current is applied between the upper electrode and the lower electrode.

To enhance the performance of the conventional ELD, the emitting material and dielectric layer material are very important.

The conventional white-light emitting ELD which was developed by using a single light-emitting layer has been developed using materials of ZnS:Pr, SrS:Pr, and SrS:Eu, Ce,K. An electroluminescent display of an SrS:Pr emitting layer using a single emitting center of Pr has an emitting level of 50 $cd/m^2$.

In the industry, $SiO_xN_y$, $Ta_2O_5$, $TiO_2$, and $Al_2O_3$ are commonly used as the materials of a dielectric layer.

In case of using an $SiN_x$, since the dielectric constant of a dielectric layer is 4 to 6, which is relatively low, an emitting threshold voltage disadvantageously increases due to the voltage drop caused by a dielectric layer when electric power is applied thereto.

Meanwhile, in case of an ELD having a single dielectric film of $Ta_2O_5$, since a dielectric constant is 25 to 29, which is relatively high, the level of the voltage decrease caused by the dielectric layer is reduced. As a result, the threshold voltage is advantageously decreased; however, the threshold voltage varies, and a threshold voltage characteristic degrades due to a leaky characteristic of a $Ta_2O_5$ as an operation time lapses.

SUMMARY OF THE INVENTION

Accordingly, it is an object of the present invention to provide a white-light emitting electroluminescent display and a fabricating method thereof, which overcome the problems encountered in the conventional white-light emitting electroluminescent display and a fabricating method thereof.

It is another object of the present invention to provide an improved white-lite emitting electroluminescent display capable of emitting a light having a red, blue, and green wave length in a single layer and having a buffer layer of $Si_xN_y$ between a lower dielectric layer of $BaTa_2O_6$ and an light-emitting layer.

To achieve the above objects, there is provided a white-light emitting electroluminescent display, which includes a substrate; a lower dielectric layer of $BaTa_2O_6$ formed on a transparent electrode; a buffering layer of $Si_xN_y$ formed on the lower dielectric layer; a light-emitting layer of SrS:Pr,F formed on the buffer layer; a upper dielectric layer of $BaTa_2O_6$ formed on the light-emitting layer; and an upper electrode formed on the upper dielectric layer.

To achieve the above object, there is further provided a white-lite emitting electroluminescent display fabricating method, which includes the steps of a first step which forms a lower electrode on a substrate; a second step which forms a buffer layer of $Si_xN_y$ on the lower dielectric layer; a third step which forms a light-emitting layer of SrS:Pr,F on the buffer layer; a fourth step which forms a upper dielectric layer of $BaTa_2O_6$ on the light-emitting layer; and a fifth step which deposits an aluminum electrode on the upper dielectric layer.

DETAILED DESCRIPTION OF THE INVENTION

Figure 1:
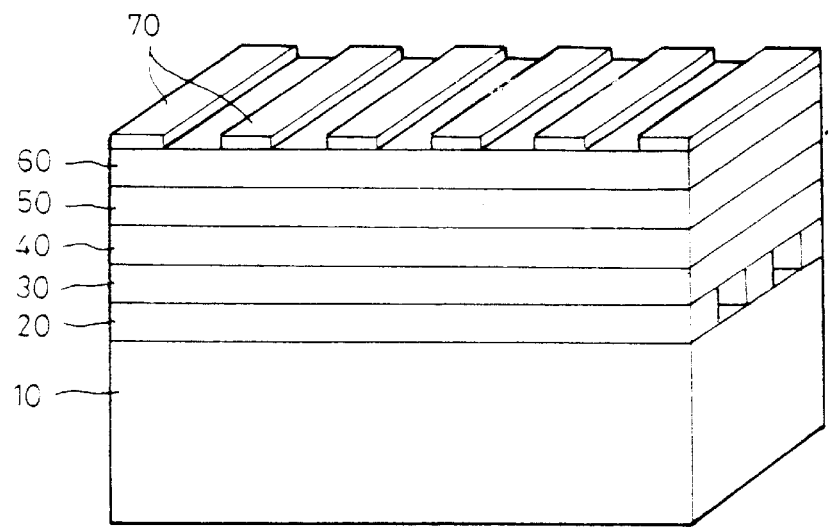
FIG. 1 is a cross-section view showing a structure of a white-light emitting electroluminescent display according to the present invention.

In the present invention, SrS:Pr,F is used as a light-emitting layer, and $BaTa_2O_6$ is used as a dielectric layer, $Si_xN_y$ is deposited between a light-emitting layer and a dielectric layer. An electroluminescent display of the present invention is directed to decrease a voltage decrease which is caused by a dielectric layer and to provide a better threshold voltage by preventing a heat damage of a device in accordance with an operation time.

A white-light emitting electroluminescent display according to the present invention includes a substrate 10, a lower electrode 20 formed on the substrate 10, a lower dielectric layer 30 of $BaTa_2O_6$ formed on the lower electrode, a buffer layer 40 formed on the lower dielectric layer 30, a light-emitting layer 50 of SrS:Pr,F formed on the buffer layer 40 a upper dielectric layer 60 of $BaTa_2O_6$ formed on the buffer layer 50, and an upper layer 70 formed on the upper dielectric layer 60.

The electroluminescent display can include a buffer layer of $Si_xN_y$ between the upper dielectric layer and the light-emitting layer.

The above described buffer layer of $Si_xN_y$ is directed to prevent a ion movement between neighboring layer and have a thickness of 50~100 nm.

The white-light emitting electroluminescent display according to the present invention can include a passivation layer on the upper dielectric layer for protecting a device from a foreign chemical when etching the upper electrode. The passivation layer of $SiO_xN_y$ can be formed using a reactive sputtering method which is one of well known methods in the industry.

The fabrication of the white-light emitting electroluminescent display according to the present invention includes the steps of a first steps which forms a lower electrode on a substrate, a second step which forms a lower dielectric layer of $BaTa_2O_6$ on the lower electrode, a third step which forms a buffer layer of $Si_xN_y$ on the lower dielectric layer, a fourth step which forms a light-emitting layer of SrS:Pr,F on the buffer layer, a fifth step which forms a upper dielectric layer of $BaTa_2O_6$ on the light-emitting layer, a sixth step which forms an upper electrode on the upper dielectric layer.

Here, the light-emitting layer of SrS:Pr,F is fabricated by the following methods.

To begin with, powder of SrS(3N) and $PrF_3$ is well mixed using alcohol liquid to have a ratio of 0.3~1.6 mol % with respect to SrS, and poured into a bottle of polyethylene. Thereafter, the bottle is filled with zirconia balls and sealed. In a ball mill apparatus, the mixture of SrS and $PrF_3$ is mixed for more than 24 hours.

The liquid mixed in a slurry state is dried in an electric oven for more than 24 hours. The dried powder is heated at a high temperature so that Pr substitutes into Sr in host material of SrS. The heat processing is performed in a tube-shaped electric oven at 1100° C. for 1 hour, and during the process, the gas of $N_2$ and $H_2$ which are combined in a ratio of 9:1 is continuously flowed thereinto. At this time, the gas of $H_2$ is provided to prevent an oxidization of the host material of SrS. After the heating process, the powder is ground and filtered by a filtering net four or six times. Thereafter, a pellet having a thickness of 4 mm and a diameter of about 10 mm is made of the powder using a commercial cold press apparatus. At this time, since a sulfur deficiency occurs inside the thin film which is build up due to the high vapor pressure of a sulfur when depositing the thin film of SrS, the present invention is directed to fabricate the pellet by mixing a solid sulfur of a 5N purity to have a weight ratio of 0.1~0.3 with respect to SrS:Pr,F.

In order to compensate a sulfur deficiency in an emitting thin film, the over sulfur consumption in a light-emitting layer can be prevented by using an emitting material and a pure solid sulfur when depositing a light-emitting layer after fabricating an emitting material pallet instead of adding a solid sulfur when fabricating an emitting material pellet.

The emitting thin film layer 40 is deposited in an electron-beam deposition method using a prepared pellet, so that the emitting thin film layer can have a thickness of 800 to 1300 nm. At this time, the temperature of the substrate is maintained at 280 to 320° C., and the deposition rate is maintained at about 5 to 15 Å/sec.

For better crystallization of a thin film and suitable substitution of Pr, which is an emitting center, into a host material of SrS, the entire surface of the substrate on which a pattern is formed can be heated at 400° C. for about 30 to 60 minutes under vacuum.

The buffer layer of $Si_xN_y$ is formed on the lower dielectric layer 30 to have a thickness of 50 to 100 nm using an RF magnetron sputter. At this time, the temperature of the substrate is maintained at about 100 to 120° C., and the ratio of $N_2$ with respect to Ar is about 15 to 35%.

If necessary, a thin film of $SiO_xN_y$ is formed on the upper electrode in order to prevent an EL device. At this time, the thin film formation is conducted using an RF magnetron sputter method, the temperature of the substrate is maintained at about 90 to 120° C., and the ratio of $N_2+O_2$ with respect to Ar is about 15 to 35%.

EXAMPLE

To begin with, after photo-etching the ITO transparent electrode 20 on the glass substrate 10 of Hoya-Na40 to have a thickness of about 130 nm, a lower dielectric layer 30 is formed on the transparent electrode 20 in a sputtering method using an RF reactive sputtering apparatus.

The lower dielectric layer 30 is formed in an environment of $Ar+O_2$, and at this time, the divide pressure of $O_2$ with respect to Ar is maintained within a range of 10 to 30%, and the substrate temperature is maintained at about 50 to 120° C. The thickness of a lower dielectric layer 30 is about 200 to 300 nm.

The thin film of $Si_xN_y$ is formed on the lower dielectric layer 30 at environments of a temperature of about 100 to 120° C. and a ratio of about 15 to 35% between $N_2$ and Ar using an RF magnetron sputter.

Next, the light-emitting layer 50 is formed on the buffer layer 40. After fabricating the light-emitting material of SrS:Pr,F containing Pr of about 0.4 to 1.6 mol % and a solid sulfur, having a 5N purity, of a weight ratio of about 0.1 to 0.3 mol % with respect to SrS:Pr,F, the light-emitting layer is formed to have a thickness of about 800 to 1300 nm using an electron beam deposition method. The thin film is heat-processed at 400° C. for about 30 to 60 minutes in situ.

After forming the upper dielectric layer of $BaTa_2O_6$ by the same method as the lower dielectric layer 30 and depositing an aluminum for an upper electrode on the upper dielectric layer in a heat deposition method to have a thickness of about 1500 Å and patterning using a lift-off process, the aluminum electrode spaced apart by a predetermined distance is formed.

Figure 6:
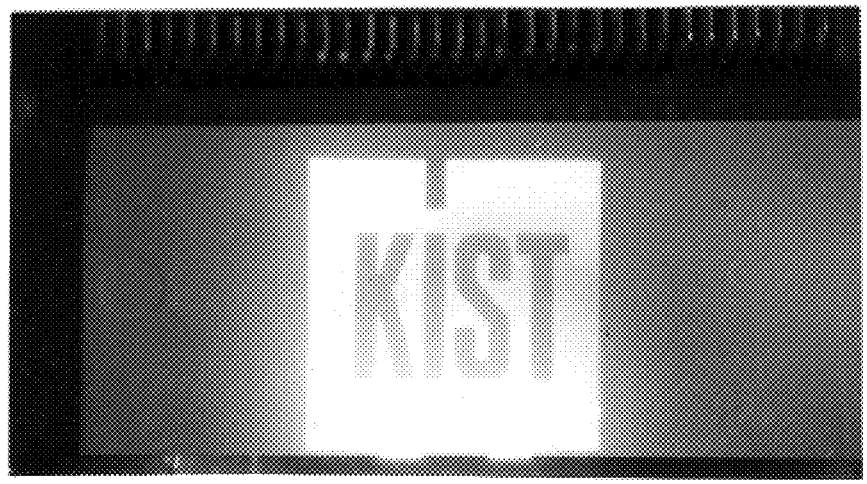
FIG. 6 is a photograph of an emitting device of a white-light emitting electroluminescent display according to the present invention.

Thereafter, in order to prevent a water penetration into the device and a physical damage, a cover glass is etched and sealed using a silicon oil. Thereafter, the device is installed on a PCB substrate, and it is connected to a driving terminal using a zebra connector. As a result thereof, an emitting phenomenon is checked as shown in FIG. 6.

Figure 2:
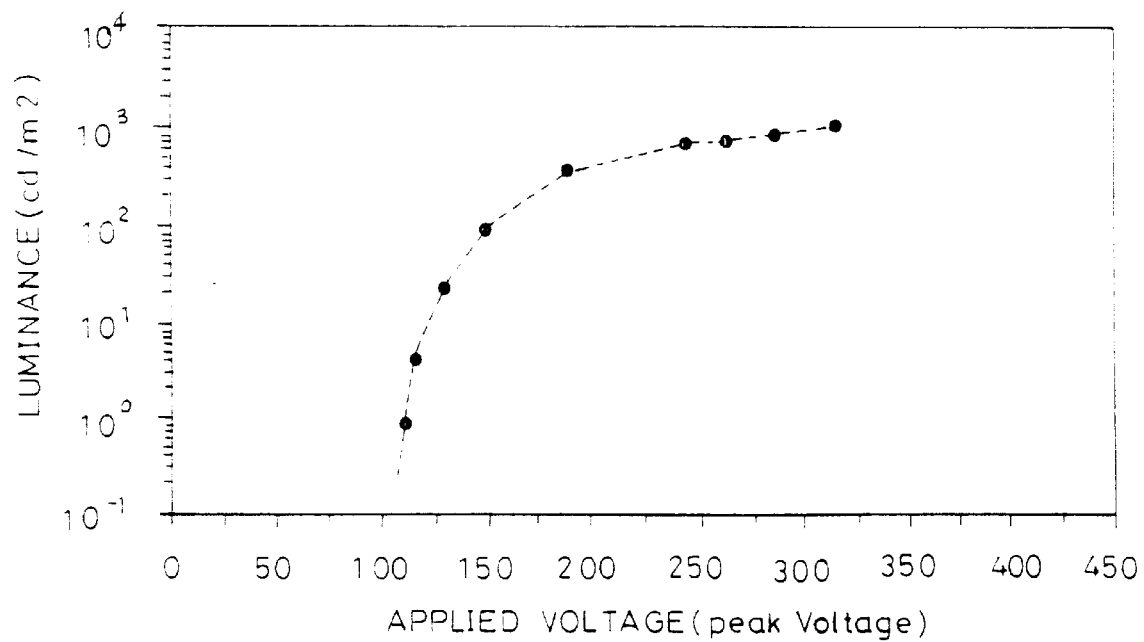
FIG. 2 is a graph of a characteristics of a luminescence in accordance with an applied voltage of a white-light emitting electroluminescent display according to the present invention.

As known in FIG. 2, the threshold characteristics of an externally applied electric power with respect to a white-light emitting display device is better for a white-light emitting display.

Figure 3:
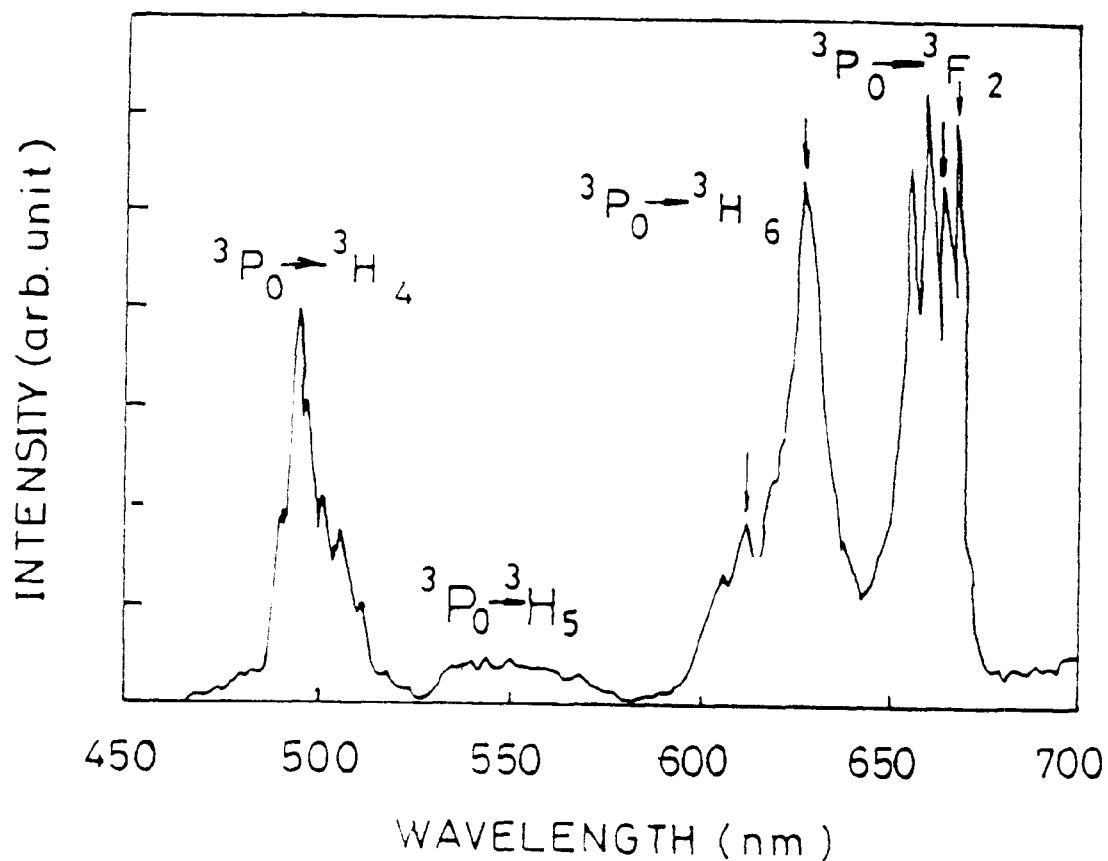
FIG. 3 is a graph of a characteristic between a light intensity and a wavelength of a white-light emitting electroluminescent display according to the present invention.

As shown in FIG. 3, the white-light emitting electroluminescent display and a fabricating method thereof according to the present invention is capable of emitting a light having wave lengths of red, blue, and green lights.

Figure 4A:
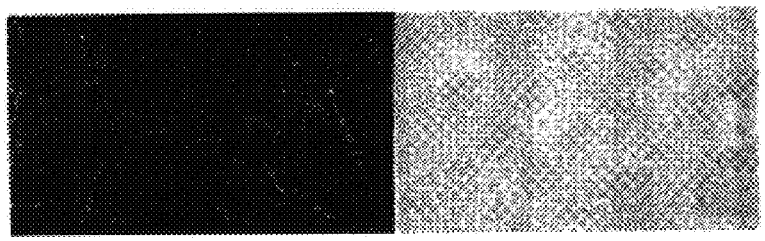
FIG. 4A is a photograph of a device of $BaTa_2O_6$/SrS:Pr, F/$Si_xN_y$/$BaTa_2O_6$ according to the present invention.
Figure 4B:
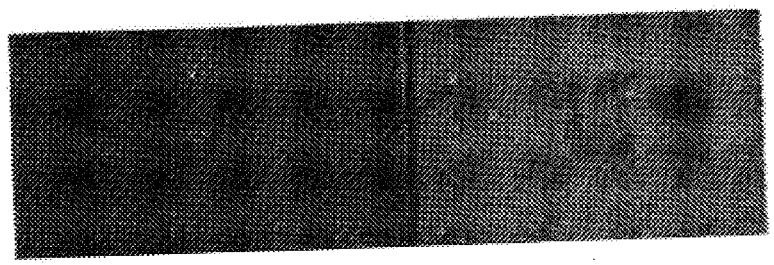
FIG. 4B is a photograph of a conventional device of $BaTa_2O_6$/SrS:Pr,F/$BaTa_2O_6$.

FIG. 4 shows a device after heating it under conditions that an external voltage is applied thereto to have a maximum brightness, in which no changes was detected in a device A according to the present invention; however, a conventional device B of $BaTa_2O_6/SrS:Pr,F/BaTa_2O_6$ had a heat damage of a threshold characteristic which generally appears an aging of a singly dielectric later of $BaTa_2O_6$.

Figure 5:
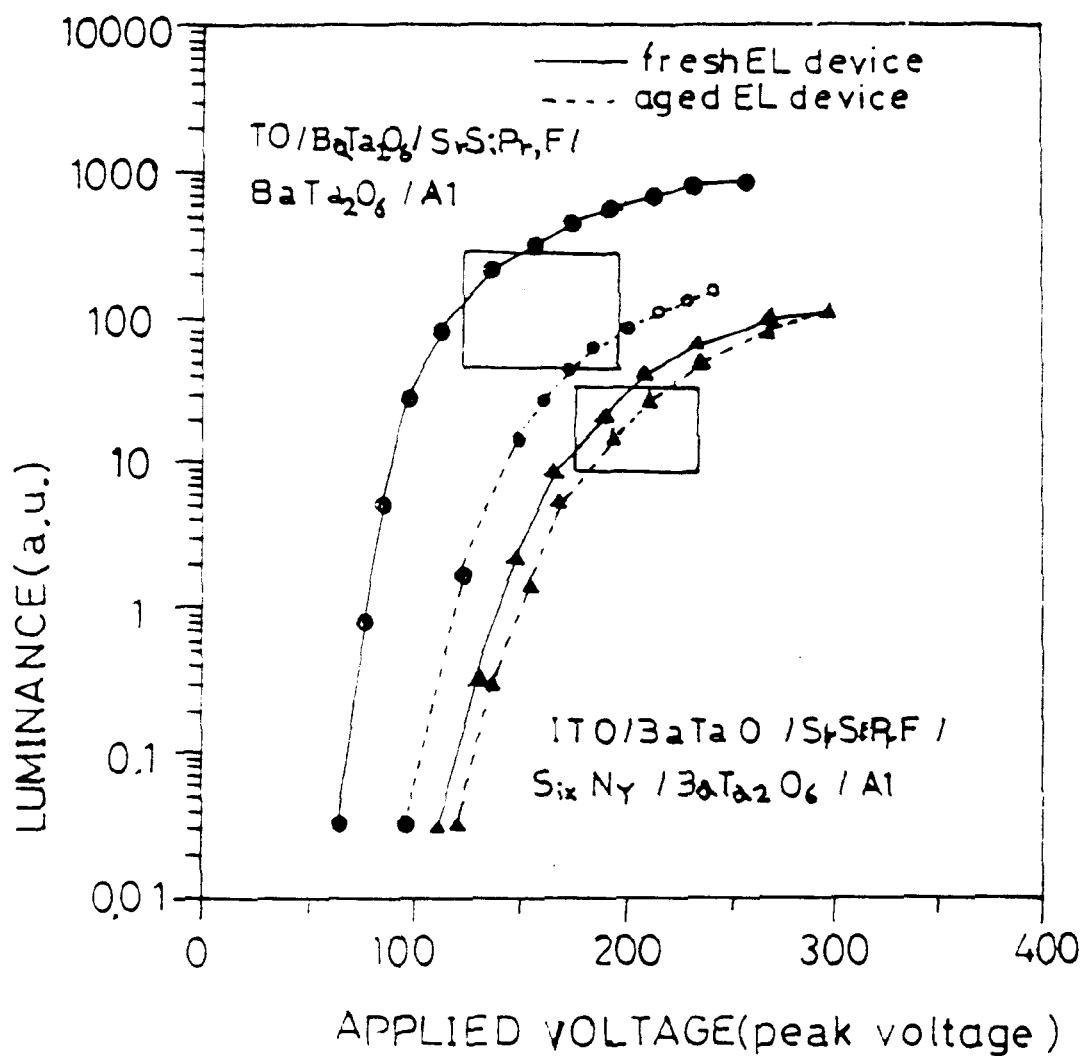
FIG. 5 is a graph of a characteristic of an emitting threshold voltage of devices, when a device of $BaTa_2O_6$/SrS:Pr,F/$Si_xN_y$/$BaTa_2O_6$ according to the present invention and a conventional device of $BaTa_2O_6$/SrS:Pr,F/$BaTa_2O_6$ are heated, respectively.

FIG. 5 shows a graph of a threshold characteristic of an emitting device when accelerating ageing the device. As shown thereon, no changes of the emitting threshold voltage are detected in the device A of the present invention.

In case of an ELD of the present invention, a spectrum distribution is evenly given over the entire visible range, and the emitting spectrum distribution characteristics are better compared with the conventional ELD.

What is claimed is:

1. A white-light emitting electroluminescent display, comprising:

a substrate;

a lower dielectric layer of $BaTa_2O_6$ formed on a transparent electrode formed on said substrate;

a first buffer layer of silicon nitride formed on said lower dielectric layer, a light-emitting layer having a phosphor material in a host material of SrS formed on said buffer layer;

an upper dielectric layer of $BaTa_2O_6$ formed on said light-emitting layer; and an upper electrode formed on said upper dielectric layer.

2. The white-light emitting electroluminescent display of claim 1, wherein a thickness of the buffer layer is 50–100 nm.

3. The white-light emitting electroluminescent display of claim 2, further comprising a second buffer layer of silicon nitride between the upper dielectric layer and the light-emitting layer.

4. The white-light emitting electroluminescent display as in any of claims 1–3, further comprising a passivation layer on the upper dielectric layer.

5. The white-light emitting electroluminescent display of claim 4, wherein the passivation layer comprises $SiO_xN_y$.

6. The white-light emitting electroluminescent display as in any of claims 1–3, in which the light-emitting layer comprises SrS:Pr,F.

* * * * *